(12) United States Patent
Hokari et al.

(10) Patent No.: US 7,435,330 B2
(45) Date of Patent: Oct. 14, 2008

(54) HEAVY OIL REFORMING METHOD, AN APPARATUS THEREFOR, AND GAS TURBINE POWER GENERATION SYSTEM

(75) Inventors: Nobuyuki Hokari, Hitachinaka (JP); Tomohiko Miyamoto, Takahagi (JP); Hirokazu Takahashi, Hitachinaka (JP); Atsushi Morihara, Hitachinaka (JP); Hiromi Koizumi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/679,397

(22) Filed: Oct. 7, 2003

(65) Prior Publication Data
US 2005/0072137 A1     Apr. 7, 2005

(51) Int. Cl.
*C10G 9/00* (2006.01)

(52) U.S. Cl. ............. 208/106; 208/134; 208/251 R; 208/208 R; 208/213; 208/253; 208/295; 208/299; 208/302

(58) Field of Classification Search ......... 208/106, 208/134, 251 R, 208 R, 213, 253, 295, 299, 208/302
See application file for complete search history.

(56) References Cited
U.S. PATENT DOCUMENTS 3,733,259 A * 5/1973 Wilson et al. ............. 208/86
3,948,755 A * 4/1976 McCollum et al. ......... 208/391
4,203,830 A * 5/1980 Rollmann et al. ......... 208/236
4,370,223 A * 1/1983 Bose ......................... 208/125
6,887,369 B2 * 5/2005 Moulton et al. ........... 208/107
2003/0168381 A1   9/2003 Hokari et al.

FOREIGN PATENT DOCUMENTS

| GB | 2 091 758 A1 | 8/1982 |
| JP | 11-80750 | 3/1999 |
| JP | 11-246876 | 9/1999 |
| JP | 2000-109851 | 4/2000 |
| JP | 2001-50010 | 2/2001 |
| JP | 2002-294257 | 10/2002 |
| JP | 2002294257 A * | 10/2002 |
| JP | 2003090227 A * | 3/2003 |
| JP | 2003097290 A * | 4/2003 |
| JP | 2003184576 A * | 7/2003 |

* cited by examiner

*Primary Examiner*—Tam M Nguyen
(74) *Attorney, Agent, or Firm*—Dickstein Shapiro LLP

(57) ABSTRACT

A heavy oil reforming method which reforms a heavy oil to give a fuel suitable for a gas turbine, eliminates sulfur and vanadium, i.e., harmful components, from a heavy oil, and enables almost all the hydrocarbons in the heavy oil to be used in gas turbine combustion; an apparatus therefor; and a gas turbine power generation system using the reformed heavy oil as fuel is disclosed. The method includes reacting a heavy oil with supercritical water and then with a scavenger for sulfur and vanadium to eliminate sulfur and vanadium from the heavy oil.

8 Claims, 3 Drawing Sheets

# HEAVY OIL REFORMING METHOD, AN APPARATUS THEREFOR, AND GAS TURBINE POWER GENERATION SYSTEM

FIELD OF THE INVENTION

The present invention relates to a heavy oil reforming method, an apparatus therefor, and a gas turbine power generation system using the reformed heavy oil as fuel.

BACKGROUND OF THE INVENTION

Various techniques for reforming heavy oils for use as fuel for the gas turbines have been proposed. There are known, for instance, a method in which the hydrocarbons in a heavy oil are decomposed with supercritical water to convert the heavy oil to a lighter type and a combustible gas is produced therefrom (JP-A-11-246876), and a proposal in which the produced gas is burned to drive a gas turbine while the residue left after oil conversion to a lighter type is burned by a boiler, using the generated heat for producing electric power by a steam turbine (JP-A-11-80750). These techniques may be boiled down to an idea of taking out part of the hydrocarbons in a heavy oil to concentrate the harmful components in the residue.

SUMMARY OF THE INVENTION

The method of generating a gas from a heavy oil with supercritical water, as stated above, is capable of reforming part of a heavy oil to provide a fuel suited for a gas turbine, but incapable of making all the hydrocarbons in a heavy oil applicable as fuel. Also, since the harmful components are concentrated in the residue, enlargement of the environmental protection equipment and measures against corrosion are required on the part of the boilers used for burning such oil.

The purpose of the invention is to provide a heavy oil reforming method which reforms a heavy oil to give a fuel suitable for a gas turbine, eliminates sulfur and/or vanadium, which are the harmful components, from a heavy oil, and enables almost all the hydrocarbons in the heavy oil to be used in gas turbine combustion: an apparatus therefor; and a gas turbine power generation system using the reformed heavy oil as fuel.

The present invention provides a heavy oil reforming method which comprises reacting a heavy oil containing at least one of vanadium and sulfur with water which is in a state of high temperature and high pressure, and then bringing said heavy oil, along with said high-temperature and high-pressure water, into contact with a scavenger for scavenging vanadium and/or sulfur in the heavy oil to thereby eliminate vanadium and/or sulfur from the heavy oil.

In the present invention, the high-temperature and high-pressure water is preferably in a state of being heated to 300° C. to 500° C. and pressured to 10 MPa to 30 MPa. More preferably, it is in a supercritical or subcritical state.

The scavenger used for eliminating at least one of sulfur and vanadium in the present invention preferably comprises at least one compound selected from iron oxide, nickel oxide, metal oxide which forms composite oxide with vanadium, ceramics which adsorb vanadium oxide, calcium compound, solid carbon such as activated carbon and coke, and hydrocarbon such as asphalt and tar, alumina, and silica.

Vanadium in the heavy oil is preferably scavenged in the form of vanadium oxide or a metallic compound of vanadic acid by the scavenger, while sulfur in the heavy oil is preferably scavenged in the form of a sulfate or metallic sulfide.

The present invention also provides a heavy oil reforming method which comprises reacting a heavy oil containing at least one of vanadium and sulfur with water, which is in a state of high temperature and high pressure, in the presence of a reaction accelerator, and then bringing said heavy oil, along with said high-temperature and high-pressure water, into contact with a scavenger for scavenging vanadium and/or sulfur in the heavy oil to thereby eliminate vanadium and/or sulfur from the heavy oil.

The reaction accelerator used in the above process preferably comprises at least one substance selected from alkali metal, alkaline earth metal, hydrogen peroxide solution, nitric acid, nitrate and formic acid.

Further, the present invention provides an apparatus for reforming a heavy oil comprising a reactor for reacting a heavy oil containing at least one of vanadium and sulfur with water which is in a state of high temperature and high pressure, a scavenging apparatus filled with a scavenger for scavenging sulfur and/or vanadium in the heavy oil, and a connecting pipe for connecting the reactor and the scavenging apparatus; wherein said scavenging apparatus has an inlet port for introducing the heavy oil along with the high-temperature and high-pressure water after the reaction and has a discharge port for discharging the reformed heavy oil.

The scavenging apparatus is preferably filled with at least one substance selected from iron oxide, nickel oxide, metal oxide which forms composite oxide with vanadium, ceramics which adsorb vanadium oxide, calcium compound, solid carbons such as activated carbon and coke, alumina, and silica.

The heavy oil reforming apparatus according to the present invention is preferably equipped with a means for adding a reaction accelerator to the high-temperature and high-pressure water supplied to the reactor. Preferably, by this reaction accelerator adding means, at least one substance selected from alkali metal, alkaline earth metals, hydrogen peroxide solution, nitric acid, nitrate and formic acid is added to the high-temperature and high-pressure water.

The present invention also provides a gas turbine power generation system comprising the said heavy oil reforming apparatus, a gas turbine burner for burning the heavy oil reformed by the heavy oil reforming apparatus, and a gas turbine driven by the combustion gas generated by the gas turbine burner.

In this gas turbine power generation system, the heavy oil reforming apparatus can be incorporated in a fuel supply system which supplies fuel to the gas turbine burner.

The power generation system can also comprise an exhaust gas heat exchanger for heating water to be supplied to the reactor in the heavy oil reforming apparatus by the exhaust gas released after the gas turbine has been operated.

According to the present invention, a heavy oil is mixed with high-temperature and high-pressure water, such as supercritical or subcritical water, and by availing of its properties as a solvent for organic matter and its action as a hydrolyzing agent, the substances to be removed such as sulfur and vanadium in the heavy oil are eliminated from inside the cyclic hydrocarbon molecules or porphyrin structure in the heavy oil, and the eliminated substances are scavenged by a scavenger through precipitation, adsorption or reaction. The optimal elimination reaction and the best scavenging efficiency can be obtained by separately determining the reaction conditions (temperature, pH, chemicals immixed, etc.) necessary for the elimination of the substances to be removed, and the conditions (temperature, pH, scavenger, etc.) necessary for scavenging.

Sulfur, one of the substances to be removed, can be eliminated in the form of a sulfate by precipitating and removing it by availing of its property that its solubility in supercritical or subcritical water varies greatly depending on temperature, or can be scavenged by making use of the reaction between metal sulfides and Ca or metal oxides, etc., or adsorption on ceramics.

Vanadium can be eliminated in the form of vanadium oxide by scavenging it by a ceramics adsorption reaction or can be scavenged in the form of a metal vanadate by making use of the formation of a composite oxide through a reaction with a metal oxide.

In an elimination reaction of the substances to be removed, an alkali metal such as Na or an alkaline earth metal can be added for accelerating the reaction. Such a metal can also act as a material for forming a sulfate after removal of sulfur. Hydrogen peroxide water, nitric acid or a nitrate can be used as an oxidizing agent to change a part of the hydrocarbon into carbon monoxide CO, and an elimination of the substances to be removed is promoted by making use of a reaction that hydrogen produced by the shift reaction of CO and water accelerates cleavage of the carbon chains. A similar effect can be obtained by introducing a material, such as formic acid, which directly provides hydrogen atoms.

According to the method of the present invention, a scavenger is applied as a fixed bed or a fluidized bed in a scavenging apparatus for scavenging from the fuel the substances to be removed which was released in the reactor, and thereby a ceramic agent is used for adsorbing calcium or vanadium oxide which may cause simultaneously a reaction with a sulfide and generation of a metal oxide which forms a composite oxide with vanadium or generation of a composite oxide with vanadium. Use of this scavenger enables scavenging of the substances to be removed and their discharge out of the system in the form of solids.

The present invention provides a system which can reform a heavy oil to a fuel suited for a gas turbine by the above-described apparatus and which is also capable of determining a reforming rate according to a fuel amount requirement of the burner by connecting the apparatus to a fuel line of a gas turbine power generation system. By using the fuel obtained by the heavy oil reforming apparatus of the present invention as a fuel system for a gas turbine power-generating plant, it is possible to remove the harmful components in the fuel, which have previously caused a serious environmental problem, and this makes it possible to prevent a corrosion of the plant equipment due to heavy metals as mentioned above and to enhance reliability of the gas turbine equipment.

As described above, the substances to be removed, such as sulfur and/or vanadium, can be eliminated from a heavy oil by an action of supercritical water as a solvent and an action of a hydrolyzing agent, and the eliminated substances are scavenged by a scavenger, so that the whole of the hydrocarbons in a heavy oil can be converted to a fuel for a gas turbine and can be burned. This enables use of low-cost heavy oils as a fuel for gas turbines, which leads to a reduction of a running cost and cuts down the equipment cost for the environmental apparatus and measures against corrosion of the gas turbines. Further, this realizes a reduction of environmental equipment cost and enables a continuous operation of the apparatus because of no ash deposition and a prevention of corrosion to attain a significant enhancement of the plant operating efficiency.

Other objects, features and advantages of the invention will become apparent from the following description of the embodiments of the invention taken in conjunction with the accompanying drawings.

EXPLANATION OF REFERENCE NUMERALS

1: mixer, 2: supercritical water, 3: heavy oil, 4: reactor, 5: connecting pipe, 6: scavenging apparatus, 7: scavenger, 8: reformed fuel, 9: reaction assistant, 10: scavenger supply line, 11: used scavenger discharge line, 12: scavenger cleaner, 13: removed substance (harmful component), 14: recycled scavenger, 15: newly fed scavenger, 16: air, 17: compressor, 18: compressed air, 19: burner, 20: combustion gas, 21: gas turbine, 22; power generator (dynamo), 23: gas turbine exhaust gas, 24: exhaust gas heat exchanger, 25: water, 26: stack.

DETAILED DESCRIPTION OF THE INVENTION

Elimination of vanadium from a heavy oil has been confirmed when a vanadium-containing heavy oil was mixed and reacted with supercritical or subcritical high-temperature and high-pressure water and then passed through a scavenger-packed bed.

More specifically, when a heavy oil containing 5 ppm of vanadium was mixed and reacted with supercritical water having a temperature of 450° C. and a pressure of 25 MPa and then passed through an activated carbon packed bed, it was confirmed that the vanadium concentration of the reformed oil reduced to 2 ppm. It was also confirmed that the vanadium concentration of the reformed oil was reduced to 0.1 ppm when a heavy oil containing 5 ppm of vanadium was mixed and reacted with subcritical water having 450° C. and 20 MPa and then passed through an activated carbon packed bed.

EXAMPLES

Example 1

Figure 1:
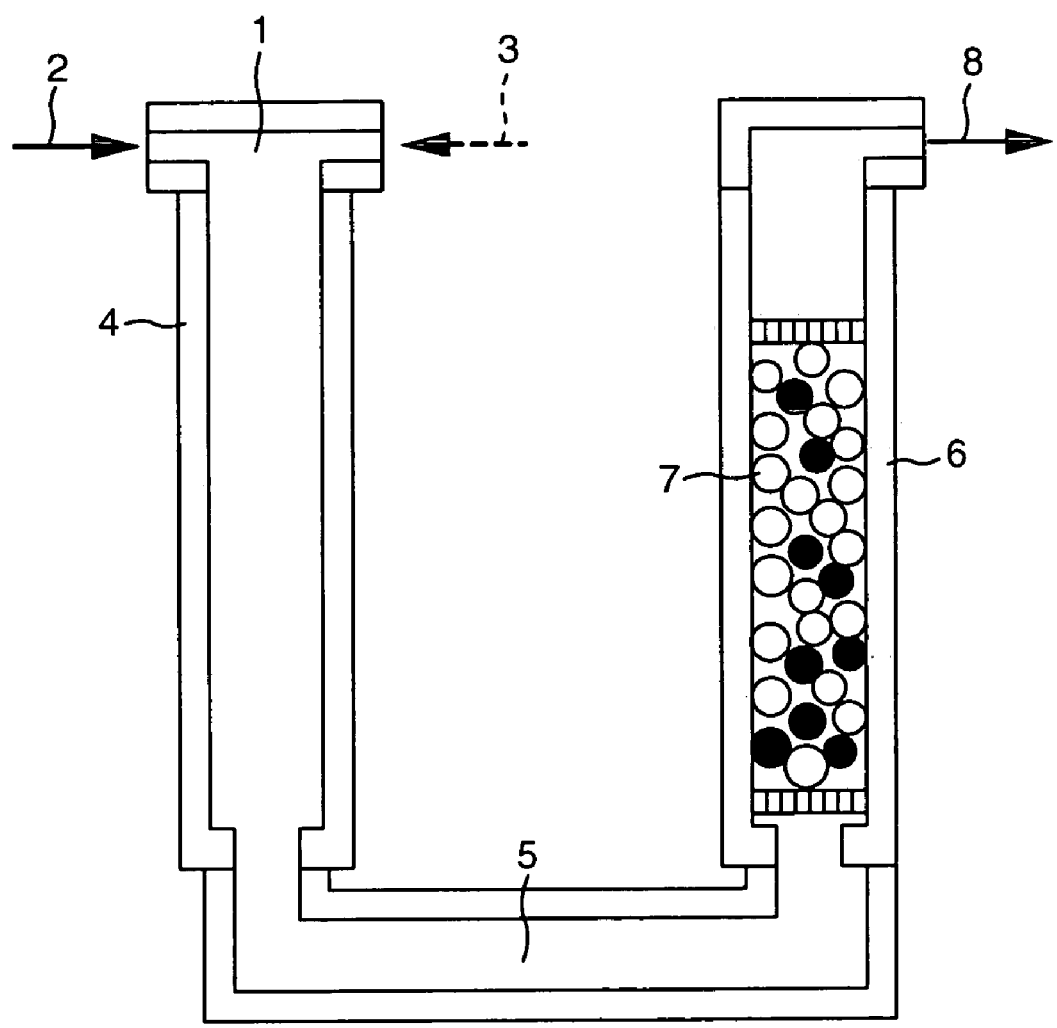
FIG. 1 is a schematic sectional view of the primary portion of the heavy oil reforming apparatus according to the present invention.

FIG. 1 is a schematic sectional view of the primary portion of the heavy oil reforming apparatus according to the present invention. At the inlet of the apparatus is provided a mixer 1 designed to receive and mix high-temperature and high-pressure water such as supercritical water 2 and a heavy oil 3. This water and heavy oil are mixed by the solvent action of the supercritical water in mixer 1, and the mixed liquid is led into a reactor 4. Mixing of supercritical water 2 and heavy oil 3 may be effected not only by simple joining of both fluids but can be also effected by forming a whirling flow or by making use of impingement of the counter flows of the two fluids for accelerating mixture.

Mixer 1 may not be provided, and super-critical water 2 and heavy oil 3 may be directly supplied into reactor 4. In reactor 4, there proceeds a reaction for eliminating from the hydrocarbon compounds the harmful components, i.e. sulfur and/or vanadium in the heavy oil under the action of super-critical water as a hydrolyzing agent. For allowing this elimination reaction to proceed, it is an essential condition that water assumes a supercritical state by the time it reaches the exit of reactor 4. In the instant example, water already brought into a supercritical state is supplied, but it is possible to let water assume a supercritical state by heating after the mixture of water and heavy oil has been supplied to mixer 1 or reactor 4.

The liquid containing the harmful components eliminated from the fuel in reactor 4 is sent to a scavenging apparatus 6 via a connecting pipe 5. Reactor 4 may be joined directly to scavenging apparatus 6 without connecting pipe 5. Scavenging apparatus 6 is filled with a scavenger 7 which scavenges the substances to be removed (harmful components). Scavenging is effected by adsorption, reaction or precipitation of the harmful components contained in the circulating liquid. Only the harmful components are scavenged in scavenging apparatus 6, and almost whole of the hydrocarbons which are to form fuel can be fed to an apparatus in subsequent stage as reformed fuel.

Scavenger 7 may be provided in scavenging apparatus 6 as a fixed bed by a grating-like fixture. It is also possible to apply granular scavenger and let it stay in the apparatus as a fluidized bed by regulating the grain size so that it can produce a greater terminal velocity than the linear velocity of the liquid. Further, the scavenger may be molded into a plate or a honeycomb structure allowing the liquid to pass through the voids therein.

The scavenging capacity of scavenger 7 may reach saturation as a result of continuous scavenging of the harmful components, so a system for taking out such used scavenger 7 from scavenging apparatus 6 or a system for giving new supply of scavenger may be provided. Also, plural sets of scavenging apparatus 6 may be provided for each reactor 4 and designed so that they can be operated in turn successively, or that the operation of part of the plural sets of scavenging apparatus may be stopped on passage of a predetermined period of time. It is also possible to adopt a layout and an operating method that allow change of the scavenger in the scavenging apparatus to which the supply of fuel was suspended. The fuel from which the harmful components were eliminated by scavenging apparatus 6 is discharged as reformed fuel 8.

In order to provide for ingress of the scavenger in the form of granules in the reformed fuel, a filter or cyclone for excluding the granules may be set on the exit side of the scavenging apparatus. In this embodiment of the invention, scavenger 7 is not limited to one type; it is expedient to properly mix other types of scavenger according to the purpose of use of the fuel, for example Ca compounds which react with sulfur atoms, metal oxides which react with vanadium oxides, and alumina, silica or such which adsorb metal oxides or serve as a precipitation bed for sulfates. Also, for obtaining the optimal temperature for the type of scavenger used by changing the temperature conditions for the reactor and the scavenging apparatus, a heater or a heat exchanger may be provided in connecting pipe 5 or scavenging apparatus 6.

Example 2

Figure 2:
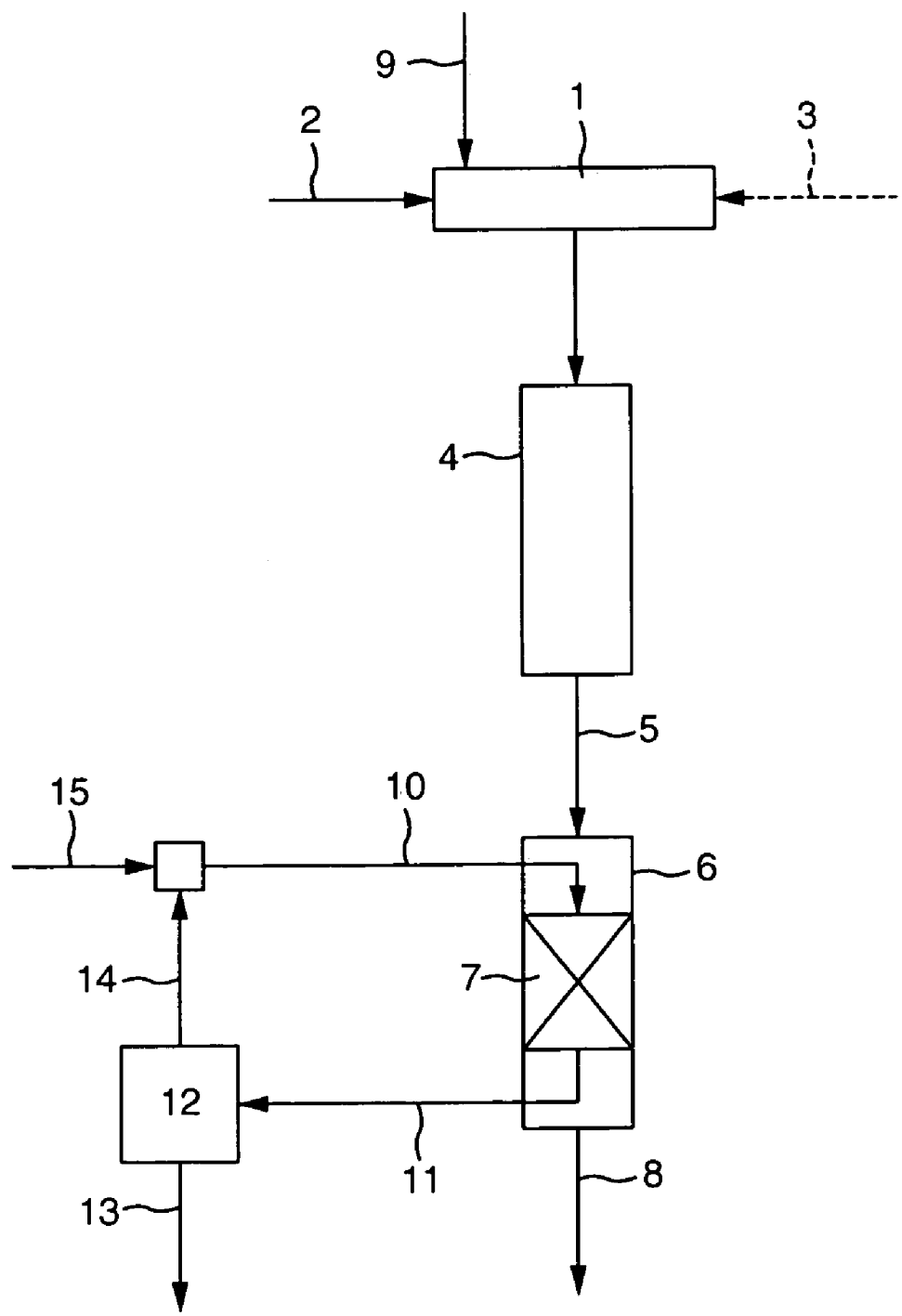
FIG. 2 is a block diagram showing the system layout of the heavy oil reforming apparatus according to the present invention.

FIG. 2 is a block diagram showing the layout of the heavy oil reforming apparatus according to the present invention. In this example, a reaction assistant 9 which functions to accelerate the harmful component elimination reaction in reactor 4 is applied in addition to supercritical water 2 and heavy oil 3 in mixer 1. Reaction assistant 9 is a material selected from alkali metal or alkaline earth metal which acts to eliminate sulfur, a harmful component, in the form of a sulfate, hydrogen peroxide solution which accelerates the hydrolytic reaction, nitrate, formic acid and the like, or a mixture of such materials.

Addition of such a reaction assistant 9 is intended to elevate the harmful component elimination efficiency in reactor 4. As mentioned in Example 1, supercritical water 2, heavy oil 3 and reaction assistant 9 may be directly supplied to and mixed in reactor 4 without providing a mixer. Also, reaction assistant 9 may be either mixed in the system or may be previously contained in supercritical water 2 or heavy oil 3 before they are supplied to the system. Since the intended reaction proceeds if supercritical water 2 takes a supercritical state before it reaches the exit of reactor 4, it may be supplied in the state of water in mixer 1 or at the inlet of reactor 4 and heated in reactor 4 to let it take a supercritical state. It is of course possible to mix reaction assistant 9 in water before supplied to the apparatus, and this is recommendable when the reaction assistant used is of a water-soluble type.

In the instant example, only one reactor 4 is provided, but it is effective to provide plural reactors and arrange them so as to provide a residence time suited for the reaction. In scavenging apparatus 6, the harmful components are scavenged by scavenger 7. In order to prevent the scavenging capacity of the scavenger 7 from reaching saturation, there are provided a system 11 for discharging the used scavenger and a system 10 for introducing a fresh supply of scavenger. The discharged used scavenger is forwarded to a scavenger cleaner 12 where the used scavenger is subjected to the cleaning and reacting operations to eliminate the harmful components 13, and the regenerated scavenger is recycled to the scavenger supply system as indicated at 14.

For supplementing the scavenging capacity lowered by the reaction, a new supply of scavenger 15 is added to the recycled scavenger and the mixture is returned to scavenging apparatus 6. This arrangement is effective when the granules stay in a fluidized state. In case scavenger 7 is applied as a fixed bed or molded into a plate or a honeycomb structure, it can not be easily taken out of the system. In such a case, plural sets of scavenging apparatus 6 may be provided and arranged so that change or renewal of scavenger 7 can be effected as desired by stopping the operation of part of the apparatus in turn. It is also effective to provide plural sets of scavenging apparatus 6 and arrange them so as to provide a residence time necessary for the supplementing work.

Example 3

Figure 3:
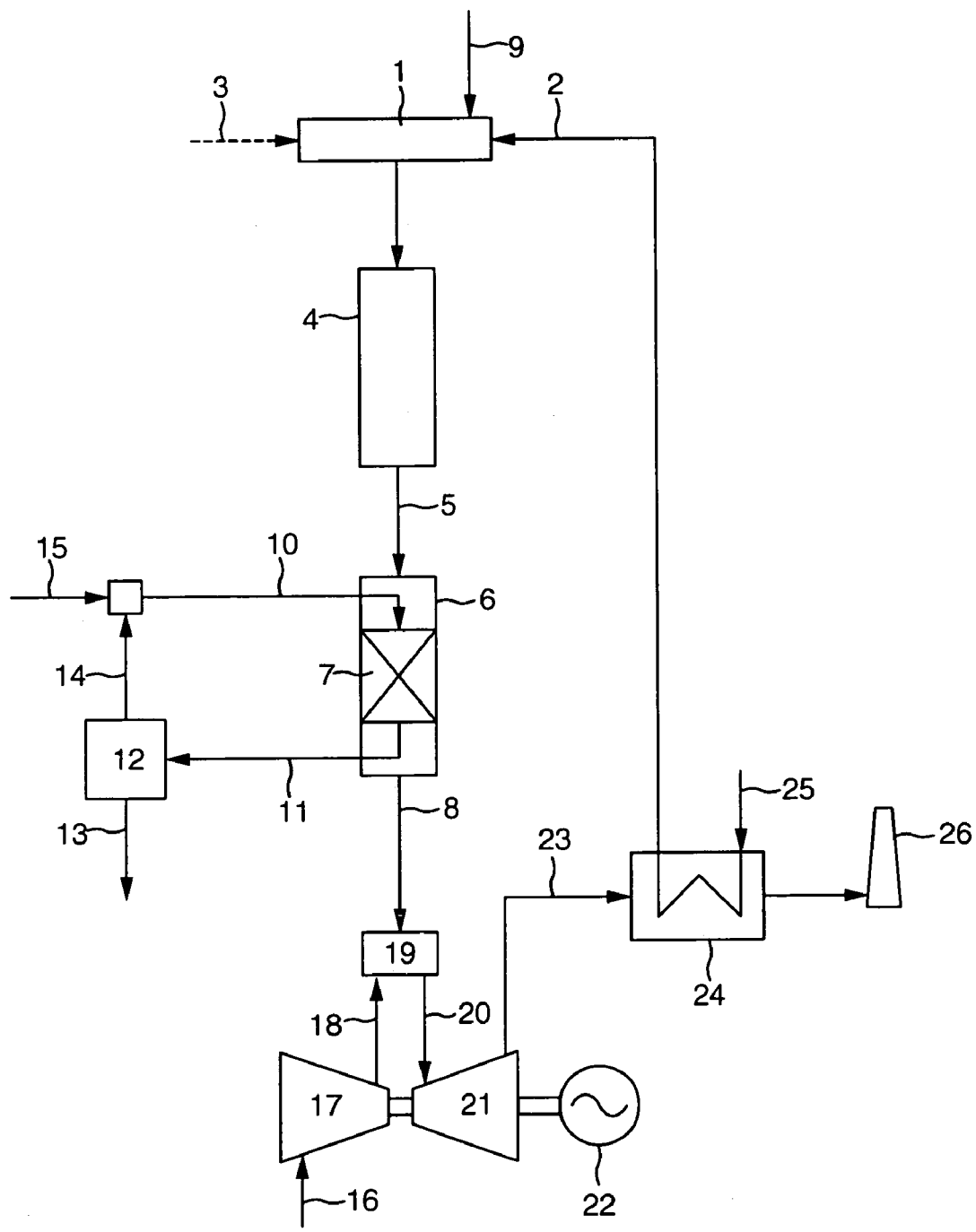
FIG. 3 is a block diagram showing a gas turbine power generation system connected to the heavy oil reforming apparatus of the present invention.

FIG. 3 is a block diagram showing an example of the gas turbine power generation system using the heavy oil reforming apparatus according to the present invention. In Examples 1 and 2, the reformed fuel 8 may be kept in storage or transported for use in a power plant, but in the instant example, the reformed fuel is immediately burned by a burner in the power generation system. Like in Example 2, a reaction accelerator 9 which accelerates the target substance elimination reaction in reactor 4 is mixed in addition to supercritical water 2 and heavy oil 3 in mixer 1.

Reaction accelerator 9 is a material selected from alkali metal or alkaline earth metal which eliminates sulfur, which is a substance to be removed, in the form of a sulfate, hydrogen peroxide solution which accelerates the hydrolytic reaction, and other materials such as nitrate and formic acid, or a mixture of such materials. The substances to be removed are eliminated from oil in reactor 4 and scavenged by scavenger 7 in scavenging apparatus 6. In order to prevent the scavenging capacity of scavenger 7 from reaching saturation, there are provided a system 11 for discharging the used scavenger and a system 10 for feeding a new supply of scavenger. The discharged used scavenger is forwarded to a scavenger cleaner 12 where the used scavenger is subjected to the cleaning and reacting operations to eliminate the substances to be removed 13, and the regenerated scavenger is recycled to the scavenger supply system as indicated at 14.

For supplementing the scavenging capacity lowered by the reaction, a new supply of scavenger 15 is added to the recycled scavenger and the mixture is returned to scavenging apparatus 6. In this example, there is provided only one set each of reactor 4 and scavenging apparatus 6, but it is effective to provide plural sets of both reactor and scavenging apparatus so that a residence time suited for the reaction and scavenging will be provided according to the amount of fuel supplied to gas turbine burner 19. The thus produced reformed fuel 8 is burned by burner 19 with air 18 compressed by compressor 17, and gas turbine 21 is driven by combustion gas 20 to generate power by dynamo 22 connected to gas turbine 21. Exhaust gas 23 from the gas turbine is led into exhaust gas heat exchanger 24 where heat is transferred from gas to water 25 to generate supercritical water 2. Utilization of exhaust gas heat contributes to the improvement of system working efficiency. As in the conventional composite gas turbine power generation system, the exhaust gas recovering boilers may be provided in front and in the rear of exhaust gas heat exchanger 24 and a steam turbine may be driven by the produced steam to generate electric power. A denitrating apparatus may be provided for removing the nitrogen oxides produced by combustion. Since sulfur in the heavy oil is eliminated by scavenging apparatus 6, there is no need of providing a desulfurizing apparatus nor any requirement of expenditure for the construction of new environmental equipment which is otherwise required in use of heavy oils.

Further, in the construction of this embodiment, since vanadium in the heavy oil is removed by scavenging apparatus 6, there is no fear of high-temperature corrosion of the gas turbine, which makes it unnecessary to add an additive, such as magnesium, for producing a composite oxide with vanadium. Consequently, deposition of metal oxide ash on the turbine impeller blades is prevented, and a continuous operation of the system with the same degree of efficiency as the gas turbine system using light oil fuel is made possible, so that an improvement of plant working efficiency and high-efficiency power generation can be realized.

Operation of the gas turbine is explained here. At the start, the gas turbine is driven by an external motive power such as produced by a starting motor, and compressed air 18 supplied from compressor 17 and fuel are mixed and ignited by burner 19. After ignition, the combustion gas 20 generated by burner 19, i.e. heat energy, is converted to a rotating energy by turbine 21, and with rise of the flow rate of fuel to burner 19, the gas turbine is increased in speed and proceeds into self-supporting operation. Then, after the gas turbine reached the no-load rated rotational speed, dynamo 22 is operated to generate power.

In the instant embodiment, supercritical water 2 is generated by utilizing the heat produced by exhaust gas heat exchanger 24, but it is also effective to provide a starting boiler beside heat exchanger 24 and produce supercritical water 2 by utilizing its heat. In the gas turbine, after application of load, the flow rate of reformed fuel 8 supplied to burner 19 is increased (controlled) by a flow rate control valve disposed on the upstream side of the burner and on the downstream side of the reforming apparatus, and the load is increased with the rise of gas temperature at the inlet of gas turbine 21 and the increase of flow rate of combustion gas 21 until the rated load is finally reached. During this period, in mixer 1 where fuel is produced, the mixing ratio of heavy oil 3 and supercritical water 2 is adjusted to form a composition necessary for providing stabilized combustion at burner 19.

As seen from above, by structuring a power plant combining the above-described heavy oil reforming apparatus of the present invention and a gas turbine, it is possible to solve the problems, such as corrosion of gas turbine equipment, which would arise from the oxidizing reactions of impurities and which have been a bothersome problem of the conventional heavy oil-fired burners, and to improve reliability of the equipment.

EFFECTS OF THE INVENTION

According to the present invention, there are provided a heavy oil reforming method which reforms a heavy oil to give a fuel suitable for a gas turbine, eliminates only the harmful components corrosive to the gas turbine from a heavy oil, and enables almost all the hydrocarbons in the heavy oil to be used in gas turbine combustion, and an apparatus therefor. Also, as the apparatus of the present invention can be applied with no need of extending the environmental protection equipment or taking specific measures against corrosion of the gas turbine by use of a heavy oil reduced in content of sulfur and vanadium which will cause corrosion in combustion, it is possible to realize a gas turbine power generation system which is low in both of equipment cost and running cost.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method of operating a gas turbine which comprises:
   providing a heavy oil containing at least one of vanadium and sulfur;
   reacting said heavy oil with water which is heated to 300° C. to 500° C. and pressured to 10 MPa to 30 MPa by utilizing the heat of exhaust gas from said gas turbine, and then bringing said heavy oil, along with said water, into contact with a scavenger for scavenging vanadium and/or sulfur in the heavy oil to thereby eliminate vanadium and/or sulfur from the heavy oil, thereby producing a reformed oil suitable for said gas turbine, wherein the vanadium concentration of said reformed oil is reduced to 0.1 ppm or less; and
   supplying said reformed oil to said gas turbine.

2. The method according to claim 1 wherein said water is supercritical water.

3. The method according to claim 1 wherein said water is subcritical water.

4. The method according to claim 1 wherein the scavenger comprises at least one substance selected from iron oxide, nickel oxide, metal oxide which forms composite oxide with vanadium, ceramics which absorb vanadium oxide, calcium compound, hydrocarbon, solid carbon, alumina and silica.

5. The method according to claim 1 wherein said vanadium is scavenged in the form of vanadium oxide and/or a metallic compound of vanadic acid.

6. The method according to claim 1 wherein said sulfur is scavenged in the form of a sulfate and/or a metal sulfide.

7. A method of operating a gas turbine which comprises:
   providing a heavy oil containing vanadium;
   reacting said heavy oil with water, which is in a state of being heated to 300° C. to 500° C. and pressured to 10 MPa to 30 MPa by utilizing the heat of exhaust gas from said gas turbine, and then scavenging the vanadium contained in the heavy oil in the form of vanadium oxide to thereby eliminate vanadium from the heavy oil, thereby producing a reformed oil suitable for said gas turbine, wherein the vanadium concentration of said reformed oil is reduced to 0.1 ppm or less; and supplying said reformed oil to said gas turbine.

8. The method according to claim 1 wherein the scavenger is asphalt or tar.

* * * * *